United States Patent
Wegert et al.

(10) Patent No.: US 11,672,380 B2
(45) Date of Patent: Jun. 13, 2023

(54) ARTICLES THAT CAN BE BURNER SHIELDS HAVING GREASE FLOW CONTROL AND/OR CHEMICAL RESISTANCE

(71) Applicants: SCHOTT AG, Mainz (DE); SCHOTT Corporation, Elmsford, NY (US)

(72) Inventors: Theodore A. Wegert, Louisville, KY (US); Zachary D. Wimmer, Louisville, KY (US); Oliver Mühlke, Geisenheim (DE); Thomas Sadowsky, Gau-Algesheim (DE)

(73) Assignees: SCHOTT AG, Mainz (DE); SCHOTT CORPORATION, Elmsford, NY (US)

(*) Notice: Subject to any disclaimer, the term of this patent is extended or adjusted under 35 U.S.C. 154(b) by 177 days.

(21) Appl. No.: 16/294,574

(22) Filed: Mar. 6, 2019

(65) Prior Publication Data
US 2019/0274480 A1 Sep. 12, 2019

Related U.S. Application Data

(60) Provisional application No. 62/639,617, filed on Mar. 7, 2018.

(51) Int. Cl.
*A47J 37/07* (2006.01)
*C03C 3/091* (2006.01)
(Continued)

(52) U.S. Cl.
CPC ....... *A47J 37/0786* (2013.01); *C03B 23/0256* (2013.01); *C03C 3/091* (2013.01);
(Continued)

(58) Field of Classification Search
CPC .............. A47J 37/0786; A47J 37/0713; C03B 23/0256; C03B 23/0066; C03B 32/02; F24B 1/192; C03C 17/02; C03C 3/091; C03C 4/20; C03C 8/02; C03C 2217/76; C03C 2217/78; C03C 2204/00; C03C 2205/04
See application file for complete search history.

(56) References Cited

U.S. PATENT DOCUMENTS 3,704,703 A 12/1972 Takase
5,279,277 A 1/1994 Barker
(Continued)

FOREIGN PATENT DOCUMENTS

AU 2010202673 7/2011
AU 2011101307 11/2011
(Continued)

OTHER PUBLICATIONS

Google Patent Translation of EP-0629820-A2 (Year: 2021).*
Espacenet Translation of TW541167U (Year: 2022).*

*Primary Examiner* — Michael Zhang
(74) *Attorney, Agent, or Firm* — Ruggiero McAllister & McMahon LLC

(57) ABSTRACT

The present disclosure relates to non-metallic articles that can be burner shields having grease flow control and/or chemical resistance. The present disclosure also relates to glass-ceramic burner shields that can have grease flow control and/or chemical resistance, and preferably both.

29 Claims, 14 Drawing Sheets

(51) Int. Cl.
    *C03C 4/20*    (2006.01)
    *C03C 8/02*    (2006.01)
    *C03B 23/025*  (2006.01)
    *F24B 1/192*   (2006.01)
    *C03C 17/02*   (2006.01)
    *C03B 32/02*   (2006.01)
    *C03B 23/00*   (2006.01)

(52) U.S. Cl.
    CPC .................. *C03C 4/20* (2013.01); *C03C 8/02* (2013.01); *C03C 17/02* (2013.01); *F24B 1/192* (2013.01); *C03B 23/0066* (2013.01); *C03B 32/02* (2013.01); *C03C 2204/00* (2013.01); *C03C 2205/04* (2013.01); *C03C 2217/76* (2013.01); *C03C 2217/78* (2013.01)

(56) References Cited

U.S. PATENT DOCUMENTS

| | | | |
|---|---|---|---|
| 5,617,778 | A | 4/1997 | Schroeter |
| 5,691,254 | A * | 11/1997 | Sakamoto ................ C03C 8/02 428/426 |
| 5,735,260 | A | 4/1998 | Rimback |
| 5,878,739 | A | 3/1999 | Guidry |
| 6,114,666 | A | 9/2000 | Best |
| 6,125,838 | A | 10/2000 | Hedgpeth |
| 6,763,824 | B1 | 7/2004 | Hsu |
| 6,966,253 | B2 | 11/2005 | Witzel |
| 8,037,879 | B2 | 10/2011 | Murrin |
| 8,113,191 | B2 | 2/2012 | Hong |
| 8,234,973 | B1 | 8/2012 | Rhee |
| 8,662,070 | B2 | 3/2014 | Johnston |
| 8,875,622 | B2 | 11/2014 | Chung |
| D722,819 | S | 2/2015 | Lu |
| 9,097,428 | B2 | 8/2015 | Tang |
| 9,492,032 | B2 | 11/2016 | Chung |
| 9,504,352 | B2 | 11/2016 | Lin |
| 2001/0017132 | A1 | 8/2001 | Yokoyama |
| 2002/0011244 | A1 | 1/2002 | Giebel |
| 2004/0025862 | A1 | 2/2004 | Lor |
| 2005/0098168 | A1 | 5/2005 | Williams |
| 2005/0284461 | A1 | 12/2005 | Hsu |
| 2006/0112949 | A1 | 6/2006 | Ducate |
| 2007/0056961 | A1 * | 3/2007 | Shimatani ................ H05B 3/74 219/729 |
| 2009/0255414 | A1 | 10/2009 | Wang |
| 2010/0139650 | A1 | 6/2010 | Pritchard |
| 2012/0058303 | A1 * | 3/2012 | Gabel ................ C03B 23/0305 428/141 |
| 2012/0138046 | A1 | 6/2012 | Kyte |
| 2012/0266856 | A1 | 10/2012 | Zelek |
| 2015/0251943 | A1 * | 9/2015 | Wada ................ C03B 23/0256 428/130 |
| 2015/0299036 | A1 * | 10/2015 | Ukrainczyk ............ C04B 35/19 65/30.13 |
| 2015/0369492 | A1 * | 12/2015 | Lecomte ................ C03C 8/04 219/391 |
| 2016/0236975 | A1 * | 8/2016 | Sugimoto ............... C03C 15/00 |
| 2016/0264455 | A1 * | 9/2016 | Weber ..................... C03C 17/04 |
| 2016/0265787 | A1 | 9/2016 | Van Zutphen |
| 2018/0071881 | A1 * | 3/2018 | Horie ................ C03C 21/002 |
| 2018/0072613 | A1 * | 3/2018 | Minorikawa ........... C03C 15/00 |
| 2018/0134614 | A1 * | 5/2018 | Hall .................... C03B 23/0357 |

FOREIGN PATENT DOCUMENTS

| | | | |
|---|---|---|---|
| EP | 0629820 A2 * | 12/1994 | ............ F24C 15/102 |
| EP | 3037392 | 6/2016 | |
| FR | 2305689 | 10/1976 | |
| TW | 541167 U * | 5/2017 | |
| WO | 2008086564 | 7/2008 | |

\* cited by examiner

| | samples | | | | | |
|---|---|---|---|---|---|---|
| | 1 | 2 | 3 | 4 | 5 | 6 |
| opening angle total (α) [°] | 142.30 | 144.70 | 151.50 | 104.50 | 213.80 | 182.60 |
| opening angle R1 (α1) [°] | 108.90 | 100.70 | 92.90 | 66.90 | 146.00 | 143.00 |
| opening angle R2 (α2) [°] | 16.70 | 22.00 | 29.30 | 18.80 | 33.90 | 19.80 |
| inner Radius (R1) [mm] | 38.00 | 69.40 | 45.50 | 86.20 | 30.00 | 35.00 |
| outer radius (R2) [mm] | 70.00 | 145.00 | 90.00 | 170.00 | 58.50 | 93.00 |
| width (w) [mm] | 80.50 | 160.00 | 110.00 | 176.30 | 59.30 | 75.90 |
| length (l) [mm] | 463.60 | 299.00 | 275.00 | 323.80 | 446.30 | 435.00 |
| height (h) [mm] | 35.00 | 75.00 | 55.00 | 54.40 | 54.90 | 55.50 |
| arc length (al) [mm] | 109.40 | 228.50 | 160.60 | 208.30 | 140.00 | 146.80 |
| arc length R1 (al1) [mm] | 69.37 | 118.46 | 70.53 | 98.31 | 72.62 | 83.61 |
| arc length R2 (al2) [mm] | 19.97 | 54.91 | 45.00 | 55.12 | 33.72 | 31.62 |
| thickness (t) [mm] | 3.00 | 4.00 | 4.00 | 4.00 | 3.00 | 3.00 |
| | | | | | | |
| Ratio R2/R1 | 1.84 | 2.09 | 1.98 | 1.97 | 1.95 | 2.66 |
| Ratio α1/α2 | 6.52 | 4.58 | 3.17 | 3.56 | 4.31 | 7.22 |
| Ratio al/α | 0.77 | 1.58 | 1.06 | 1.99 | 0.65 | 0.80 |
| Ratio w/h | 2.30 | 2.13 | 2.00 | 3.24 | 1.08 | 1.37 |
| Ratio al1/al2 | 3.47 | 2.16 | 1.57 | 1.78 | 2.15 | 2.64 |

FIG. 4

|  | Possible Dimensions | | Possible Preferred Dimensions | |
|---|---|---|---|---|
|  | min | max | min | max |
| opening angle total (α) [°] | 20.00 | 360.00 | 60.00 | 240.00 |
| opening angle R1 (α1) [°] | 10.00 | 180.00 | 40.00 | 160.00 |
| opening angle R2 (α2) [°] | 5.00 | 50.00 | 10.00 | 40.00 |
| inner Radius (R1) [mm] | 20.00 | 200.00 | 25.00 | 100.00 |
| outer radius (R2) [mm] | 40.00 | 400.00 | 50.00 | 200.00 |
| width (w) [mm] | 40.00 | 250.00 | 50.00 | 180.00 |
| length (l) [mm] | 200.00 | 600.00 | 300.00 | 470.00 |
| height (h) [mm] | 10.00 | 100.00 | 20.00 | 80.00 |
| arc length (al) [mm] | 50.00 | 400.00 | 100.00 | 250.00 |
| arc length R1 (al1) [mm] | 40.00 | 250.00 | 50.00 | 150.00 |
| arc length R2 (al2) [mm] | 10.00 | 100.00 | 15.00 | 70.00 |
| thickness (t) [mm] | 1.00 | 6.00 | 3.00 | 4.00 |
|  |  |  |  |  |
| Ratio R2/R1 | 1.10 | 5.00 | 1.50 | 3.00 |
| Ratio α1/α2 | 1.50 | 20.00 | 2.00 | 10.00 |
| Ratio al/a | 0.20 | 5.00 | 0.50 | 3.00 |
| Ratio w/h | 0.50 | 10.00 | 1.00 | 4.00 |

FIG. 5

ARTICLES THAT CAN BE BURNER SHIELDS HAVING GREASE FLOW CONTROL AND/OR CHEMICAL RESISTANCE

CROSS-REFERENCE TO RELATED APPLICATION

The present application claims the benefit of U.S. Provisional Patent Application Ser. No. 62/639,617, filed on Mar. 7, 2018, which is herein incorporated by reference.

BACKGROUND OF THE DISCLOSURE

1. Field of the Disclosure

The present disclosure relates to articles that can be burner shields having grease flow control and/or chemical resistance. The present disclosure also relates to non-metallic burner shields that can have grease flow control and/or chemical resistance, and preferably both.

2. Description of the Related Art

The use of metal shields to protect burners in barbecues is common. Burners without protective shields are exposed to grease drippings that form during regular use of a barbecue. The high temperature grease drippings often contain salts, fats and high humidity. Grease that contacts the metal surface of the burners can cause the metal to corrode and oxidize, leading to the formation of holes which harm cooking performance and degrade the physical integrity of the burner. To keep this issue from occurring, many barbecues utilize metal burner shields that protect the burner from grease drippings and direct the grease to flow and fall between the burners.

Most of the current burner shields are metal, or metal with protective coatings. The same process of corrosion and oxidation that affects unprotected metal burners can degrade the metal burner shields. Over time, the damage to metal burner shields can lead to holes that expose the burners to the same oxidizing effects and degradation.

SUMMARY OF THE DISCLOSURE

The present disclosure includes articles having unique configurations with multiple curved segments that can continuously connect to form a curved article that can resist chemical degradation and protect a desired object (from grease for example), and preferably both.

The present disclosure also provides non-metallic articles including glass-ceramic burner shields that can have grease flow control and chemical resistance.

The present disclosure further provides non-metallic articles that can be glass-ceramic and used as a burner shield in a burner shield assembly for a barbecue.

The present disclosure will refer in certain embodiments to non-metallic articles used as burner shields, however the disclosure contemplates the articles being useful for other purposes.

One unique aspect of the articles of the present disclosure is that the articles can have a curved body with segments having certain curvature. The curvature of each segment can be different, to create an article having segments with different curvatures. Segments with different curvatures help improve grease flow on the articles because they increase or decrease the speed that the grease flows on the segment. A segment with curvature means that the segment is not straight or planar, as opposed to the legs of conventional inverted V-shaped burner shields which are straight or planar.

Another unique aspect is that the articles of the present disclosure can be made from glass-ceramic and can have improved surface roughness, an improved glassy surface zone and/or improved chemical resistance. These improvements provide a smoother and more uniform surface that causes grease to flow more quickly off the article. The improvements also render the articles easier to clean with less frequent cleaning.

A further unique aspect is that the articles of the disclosure can be made by applying a force to a limited number of points on the outer surface (i.e. the surface that contacts the grease) of the article. Since the outer surface is contacted at only a few points during formation, the surface can have less defects and more smoothness which also causes grease to flow more quickly off the article.

Some embodiments of the disclosure provide an article comprising a curved body made of a non-metallic material in which the body comprises a first segment with a first curvature, a second segment with a second curvature, and a third segment with a third curvature. The first segment is positioned between the second segment and the third segment and the second curvature and the third curvature are different than the first curvature. The different curvatures allow the dimensions of the article to be different, to control the grease flow and/or to provide chemical resistance.

Some embodiments of the disclosure provide an article comprising a non-metallic body having a curved peak having a first curvature, a first curved side having a second curvature, and a second curved side having a third curvature, and the curved peak is between and directly connected on one end to the first curved side and on an opposite end to the second curved side. Further, the second curvature is substantially equal to (or a mirror of) the third curvature, and the first curvature is different than the second and third curvature. Again, the different curvatures allow the dimensions of the article to be different, to control the grease flow and/or to provide chemical resistance.

Some embodiments of the disclosure provide an article comprising a substantially symmetrical non-metallic curved body in which the body comprises a first segment having a first length, a second segment having a second length, and a third segment having a third length, with the first segment positioned between the second and third segments. The first length can be different than each of the second length and the third length. The first, second and third lengths can have different curvatures to allow the dimensions of the article to be different to control the grease flow and/or to provide chemical resistance.

Some embodiments of the disclosure provide an article comprising a curved body having a convex surface and a concave surface, wherein the convex surface has a certain surface roughness. The surface roughness helps control the grease flow and/or to provide chemical resistance.

The present disclosure also includes processes for producing an article.

BRIEF DESCRIPTION OF THE DRAWINGS

FIG. 4 shows measurements for sample burner shields within the scope of the disclosure.

FIG. 5 shows exemplary dimensions for burner shields within the scope of the disclosure.

DETAILED DESCRIPTION OF THE DISCLOSURE

The present disclosure provides articles having unique configurations that can have multiple curved segments that can continuously connect to form a curved article that protects a desired object from grease and/or chemical degradation and preferably both. The embodiments of the articles described herein are for illustrative purposes only and can relate to non-metallic articles including glass-ceramic burner shields that can have grease flow control and chemical resistance.

The articles can be non-metallic and can have a body comprising a material selected from the group consisting of glass-ceramic, glass, ceramic, quartz-glass, or a combination thereof, and can be used for example as a burner shield in a burner shield assembly for a barbecue. The articles can be coated, such as for example with a vitreous enamel coating. In some embodiments, the articles can comprise a material having a coefficient of thermal expansion of about −1 to about $10 \times 10^{-6}$ $K^{-1}$.

One unique aspect of the present disclosure is that the articles can have a curved body with segments having certain curvatures. The curvature of the segments can be designed to create a burner shield having segments, namely their outer surfaces, with different curvatures. Segments with different curvatures can improve grease flow on the articles because the different curvatures can increase or decrease the speed that the grease flows on the segment. The curvature of an arc is defined as the inverse of the radius of curvature (i.e. 1/radius of curvature), so the term curvature as used herein means the inverse of the radius of curvature.

In some embodiments of the disclosure, there is an article comprising an integral curved body made of a non-metallic material. The body comprises a first segment with a first curvature, a second segment with a second curvature, and a third segment with a third curvature, in which the first segment is positioned between the second and third segments. The second curvature and third curvature are different than the first curvature. As a result, the first segment can have a constant curvature and the second and third segments can have a decreasing curvature (or increasing curvature) compared to the first segment.

Figure 1:
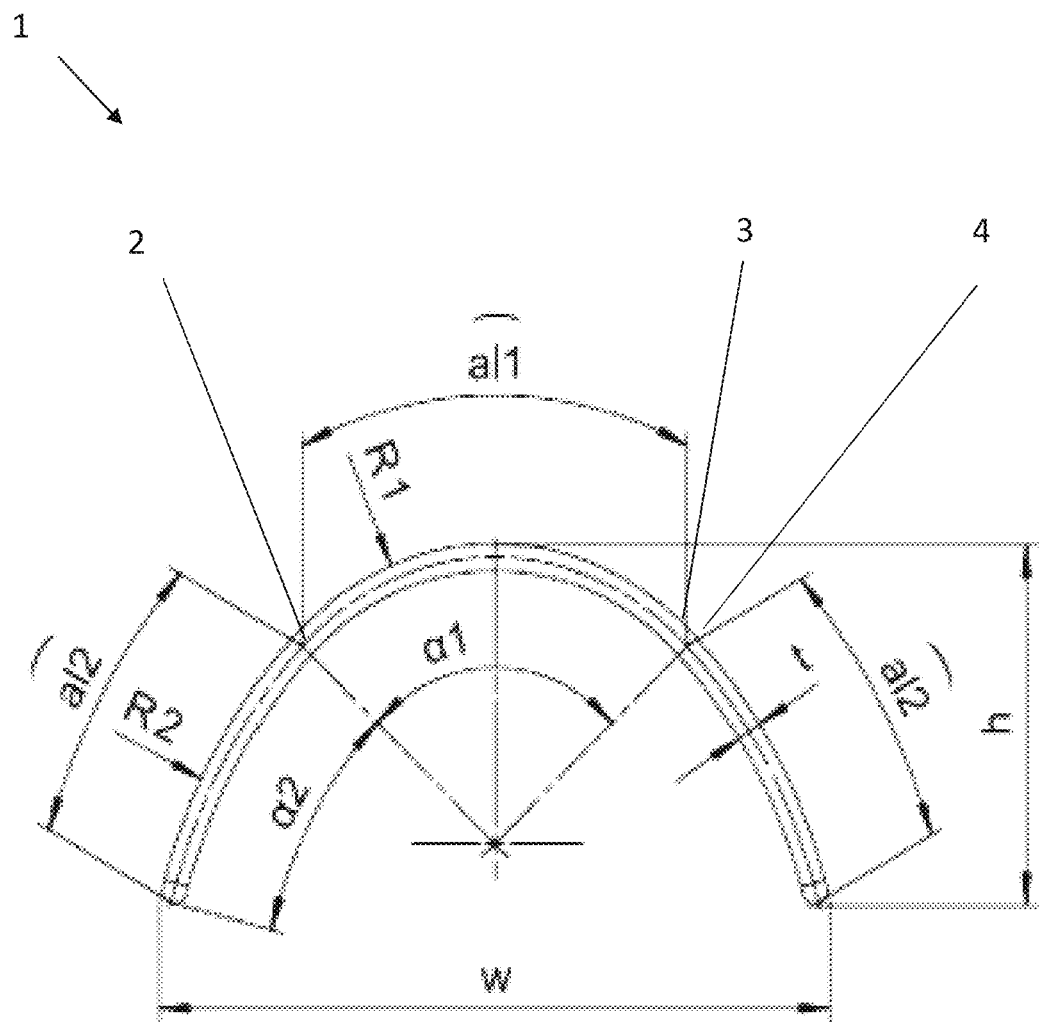
FIG. 1 depicts an exemplary geometry of a burner shield of the disclosure.

Referring to the drawings and, in particular, to FIG. 1, an article 1 having an exemplary geometry is shown. As shown, article 1 can be a burner shield having an integral curved body 2. As defined herein, integral means that the curved body is manufactured from one piece of material, such as a single piece of glass-ceramic. However, the articles of the disclosure can have an integral body or alternatively a non-integral body. A non-integral body would mean that the body comprises two or more separate pieces or elements that are connected to one another in any manner, such as with adhesive, a heat seal, or welding.

Body 2 has a first segment a11 (arc length 1) with a first curvature R1 and second and third segments a12 (arc length 2) with a second and third curvatures R2. The arc lengths are not limited to the lengths shown in FIG. 1. For example, in some embodiments, the first arc length is substantially equal to the second and third arc lengths. In some embodiments, the second arc length is less than the first and third arc lengths. In other embodiments, the second arc length is more than the first and third arc lengths.

The length of any curved element, as the term length is used herein, is determined by measuring the distance from one end point of the curved element to the other end point of the curved element, along the path or length of the element. The length can also be referred to as an arc length or an arcuate length. The shortest straight-line distance between the two end points of the curved element, often known as a chord, is not the arc length of a curved segment. In FIG. 1, the chord is the straight line width w connecting the two endpoints of article 1. Article 1 can also have a height h.

Figure 2:
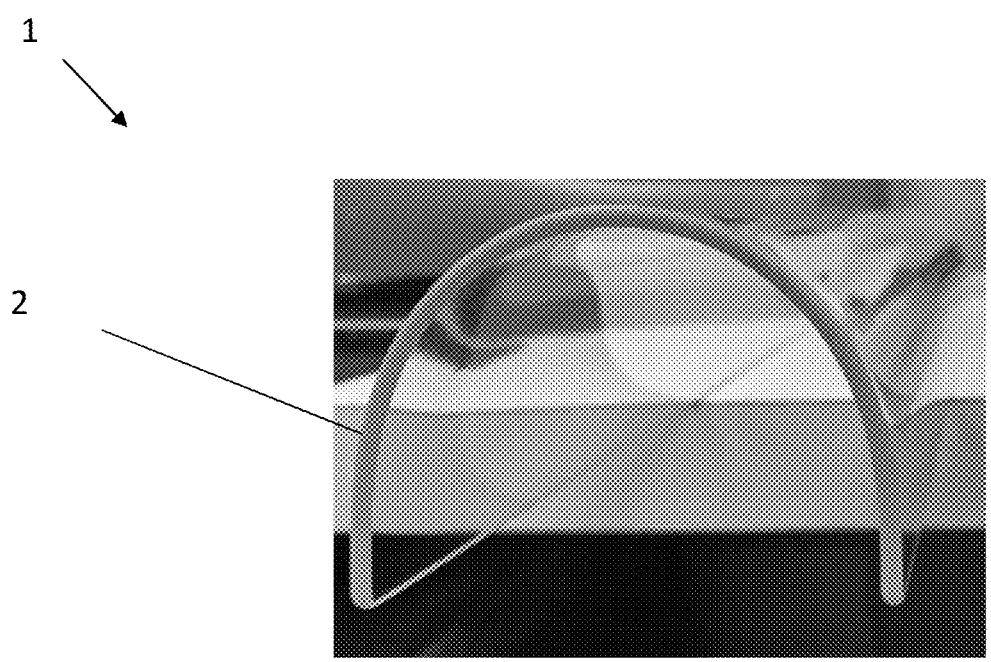
FIG. 2 illustrates a burner shield where at least a portion of the second segment and a portion of the third segment are within an imaginary or measurement circle that traces the curvature of the first segment.
Figure 3A:
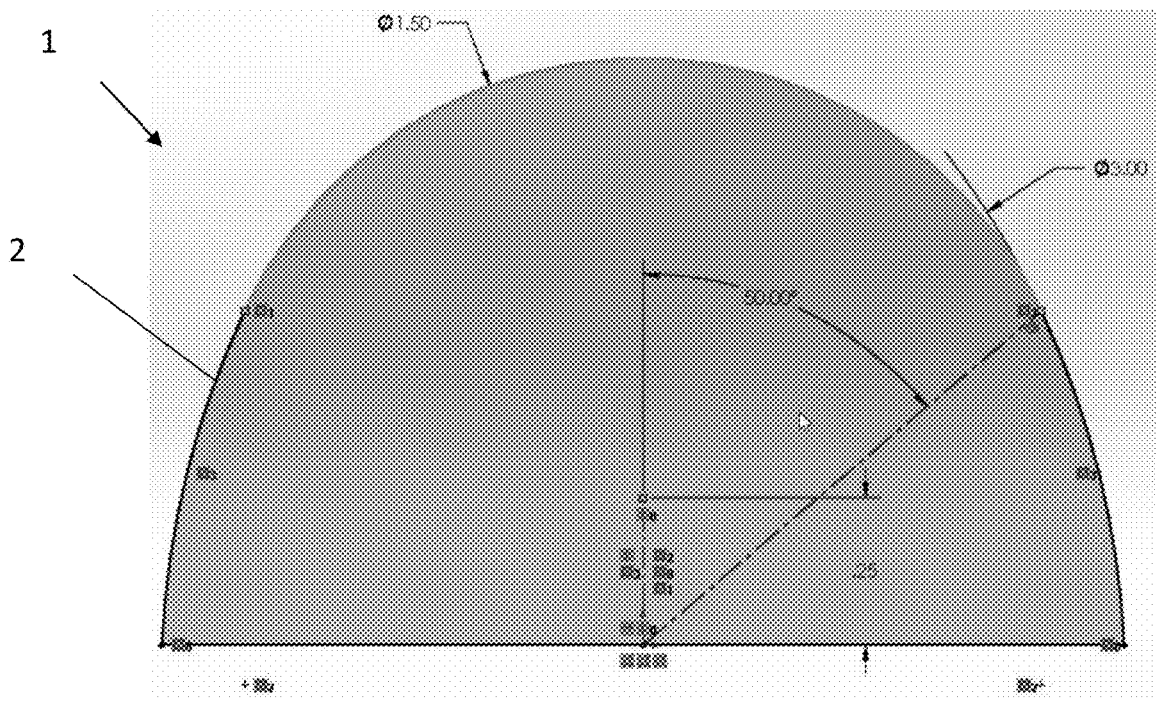
FIG. 3A illustrates a burner shield where at least a portion of the first segment is within an imaginary circle that traces the curvature of the second segment and within an imaginary circle that traces the curvature of the third segment.
Figure 3B:
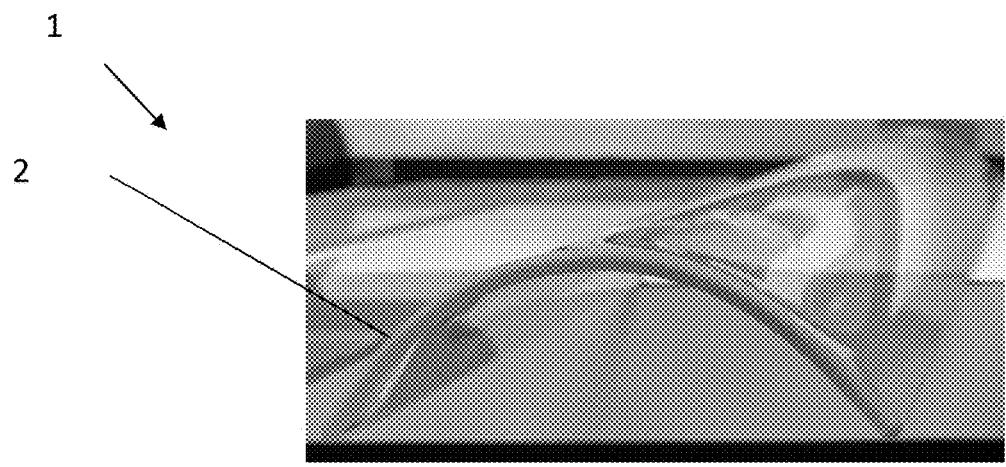
FIG. 3B illustrates a burner shield where at least a portion of the second segment and a portion of the third segment are within an imaginary circle that traces the curvature of the first segment.

The first segment a11 in FIG. 1 is positioned between the second and third segments a12. The first curvature R1 is different than the second and third curvatures R2. The different curvatures can be due to any one of a number of reasons. Significant is the fact that they are different. To achieve the different curvatures, for example, 1) at least a portion of the second or third segments a12 can be within an imaginary or measurement circle that traces the curvature of the first segment a11 (for example, as shown in FIG. 2), or 2) at least a portion of the first segment a11 can be within an imaginary or measurement circle that traces the curvature R2 of the second or third segments a12 (for example, as shown in FIG. 1 and FIGS. 3A and 3B), or 3) the second and/or third segments a12 can have a larger or smaller curvature compared to the first segment a11, so their tangent angle changes more or less rapidly compared to the first segment. This may be easier to visualize in FIG. 3A which shows a measurement line extending upward and following the curvature R2 of the third segment a12. This illustrates that at least a portion of the first segment a11 is within an imaginary circle that traces the curvature R2 of the third segment a12.

If the first curvature R1 is the same as the second and third curvatures R2, article 1 would be semi-circular. However, with different first (R1) and second and/or third (R2) curvatures, article 1 has segments with different curvatures, and the curvatures of those segments can be designed to control (i.e. increase or decrease) the speed at which grease flows off the segments. For example, when the first curvature is less than the second curvature, the slope of the first segment changes less quickly than the slope of the second segment. In other words, the top of the article has less curvature than the second side of the article. When the article is used as a burner shield, as the curvatures decrease, grease will flow more slowly, because the burner shield will become more horizontal and generally flatter. As the curvatures increase, grease will flow more quickly, because the burner shield will become more vertical and generally toward an inverted U.

It has been found that the curvatures of the segments can be adjusted to optimize grease flow control. However, the disclosure is not limited to only two segments with different curvatures. The disclosure includes embodiments with three or more segments, with at least two segments having different curvatures. This permits the entire surface of the burner shield to have different curvatures if desired.

The article 1 can have a non-metallic body with a curved peak having a first curvature, a first curved side having a second curvature, and a second curved side having a third curvature. Referring to FIG. 1, the curved peak is segment al (arc length 1) and the first and second curved sides are segments al2 (arc length 2). The curved peak is directly connected to the first and second curved sides as shown in FIG. 1. FIG. 1 shows that the first curvature is different than the second and third curvatures and the second curvature is substantially equal to (or a mirror of) the third curvature, but the second and third curvatures can be different from each other if desired.

The articles of the present disclosure can comprise a substantially symmetrical non-metallic curved body in which the body comprises a first segment having a first length, a second segment having a second length, and a third segment having a third length. The first segment can be positioned between the second and third segments. The first length can be different than each of the second length and the third length. In this embodiment and in other embodiments of the present disclosure, the article can have an arithmetic mean surface roughness (Ra) of less than about 10 µm, less than about 8 µm, less than about 5 µm, less than about 2 µm, less than about 1 µm, less than about 0.500 µm, less than about 0.200 µm, less than about 0.125 µm, less than about 0.080 µm, or less than about 0.060 µm. The articles of the present disclosure can have a ten point mean surface roughness (Rz) of less than about 20 µm, less than about 15 µm, less than about 10 µm, less than about 8 µm, less than about 5 µm, less than about 2 µm, less than about 1 µm, less than about 0.8 µm, less than about 0.6 µm, or less than about 0.5 µm. The article can have a maximum surface roughness depth (Rmax) of less than about 20 µm, less than about 15 µm, less than about 10 µm, less than about 8 µm, less than about 5 µm, less than about 2 µm, less than about 1 µm, less than about 0.8 µm, less than about 0.6 µm, or less than about 0.5 µm.

FIGS. 4 and 5 show measurements for sample burner shields within the scope of the disclosure. The measurements in FIGS. 4 and 5 were taken at the locations shown in FIG. 1. In FIG. 1, the curvatures (R1 and R2) were not measured from the same center point of the burner shield.

Figure 6:
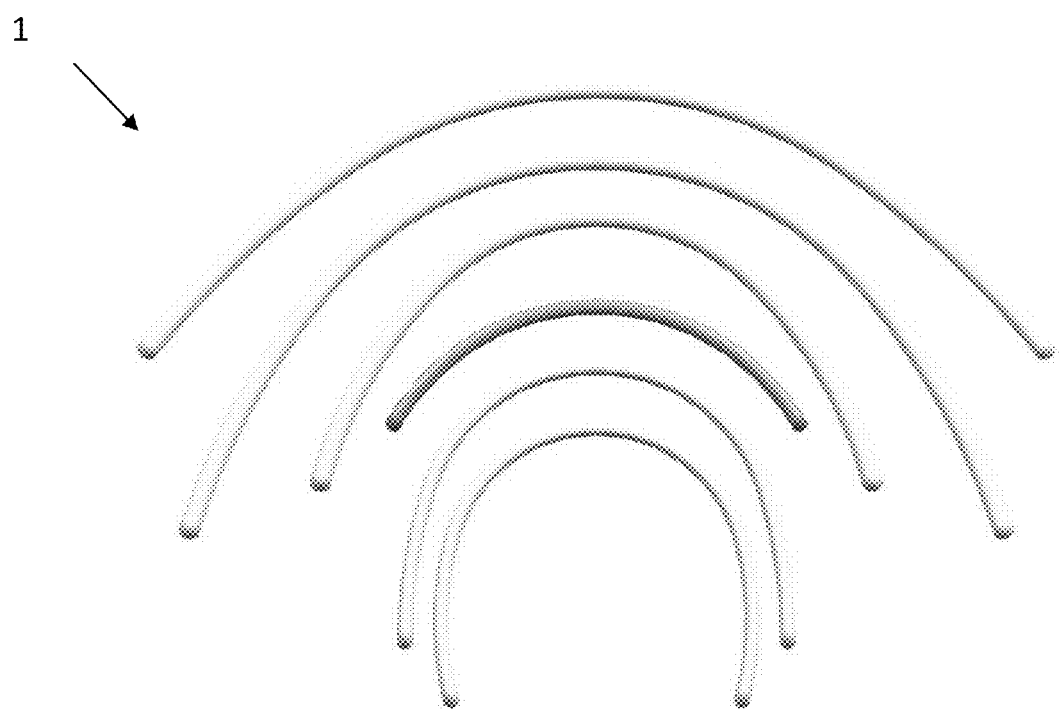
FIG. 6 shows a side view of exemplary articles of the present disclosure having several different dimensions.
Figure 7:
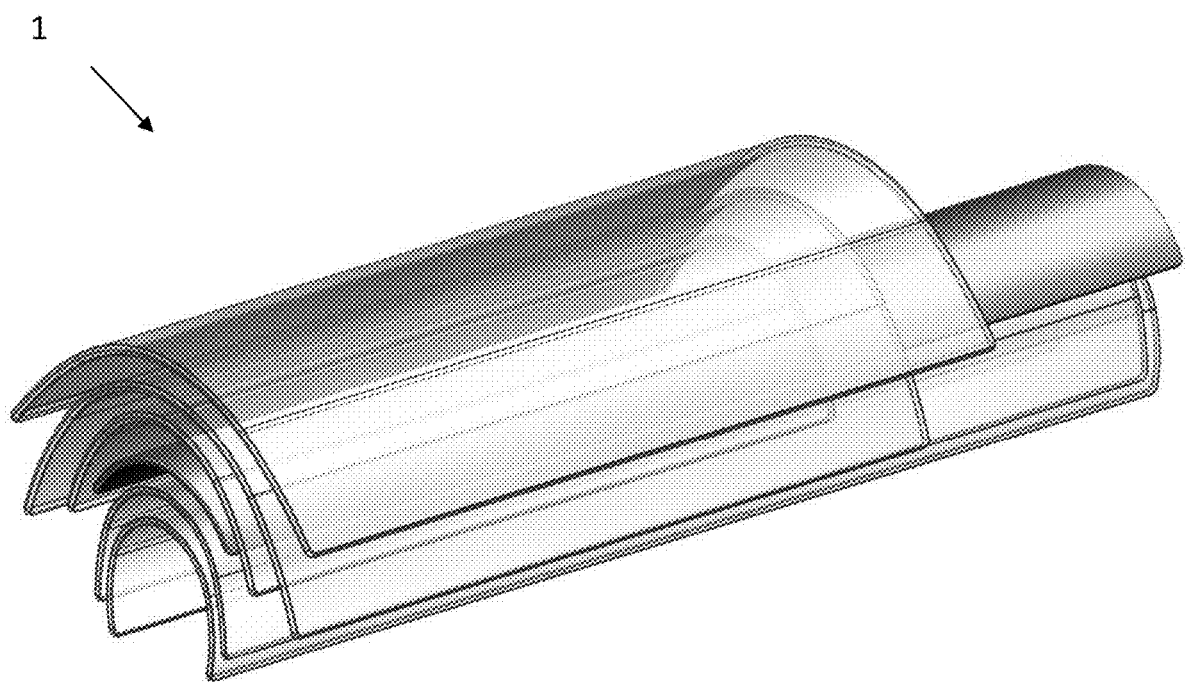
FIG. 7 shows a perspective view of the articles of FIG. 6.

FIGS. 6 and 7 show articles 1 of the present disclosure having bodies 2 with different segments different radii of curvature. As can be seen, the shapes range from a broad, slightly curved parabolic or elliptical body 2, to a steeply curved body 2 having a U-shape.

The present disclosure also contemplates an optional vitreous enamel coating on an outer surface 3 of article 1, as shown in FIG. 1. The vitreous enamel coating can improve chemical resistance. Such a coating can be applied at any time, for example by screen printing before the article is bent (bending is discussed in greater detail below) and fired during ceramization. The thickness of the enamel coating is not particularly limited and can be 1-100 µm thick, preferably 5-50 µm. The coating can have a surface roughness (Rz) between 0.1 to 30 µm, preferably 0.1 to 10 µm. The coating can be applied to article 1 on at least 50%, at least 75%, at least 90%, or at least 95% of the surface outer area of the article. In another embodiment, the vitreous enamel coating can be applied to the entire outer surface 3 of the first segment al1. Enamel coatings can be transparent, translucent or tinted.

In one embodiment, the vitreous enamel coating can comprise low thermal expansion borosilicate glass, e.g. Boro33. The coatings can also comprise glass with, e.g. 70-85% $SiO_2$, 10-20% $B_2O_3$, 2-6% $Na_2O+K_2O$, and 1-5% $Al_2O_3$. The thermal expansion of such glasses is close to the thermal expansion of the glassy surface zone, also discussed in greater detail below. This is important for adhesion of the coating to the article under thermal cycling. Borosilicate glasses are well-known for their extremely high chemical resistance, which is ideal for improving chemical resistance of burner shields.

The present disclosure also includes processes for producing articles such as glass-ceramic burner shields.

When burner shields are conventionally manufactured, the bending force is applied to the inner surface of the glass-ceramic (concave side to face the burner) causing the entire outer surface to be pushed into and against the mold. Defects can form across the entire outer surface, which produces a higher surface roughness and less chemical resistance (because of defects in the glassy surface zone). Grease does not flow well on a surface with a high surface roughness.

One process to produce a burner shield having improved surface roughness and/or chemical resistance of the disclosure is to apply a bending force during or after ceramization to a limited number of points (such as less than 30%, less than 10%, less than 5% or less than 1%) on the outer surface 3 (i.e. the side that will not face the burner—the side that contacts the grease) of the article 1 compared to conventionally manufactured burner shields. Since the outer surface 3 is contacted at only a limited number of points, the outer surface 3 can have fewer defects and greater smoothness compared to conventionally manufactured burner shields. This causes grease to flow more quickly off the burner shield.

When the article 1 is glass or glass-ceramic for example, it also improves the glassy surface zone and chemical resistance (i.e. more SiO2 formation) compared to conventionally manufactured burner shields, which also provides a more uniform surface that causes grease to flow more quickly off the burner shield. In addition, different forces can be applied at different locations, and/or different segments of the article can be moved different distances, to create the different curvature described herein.

Improving the glassy surface zone on the upper, convex surface of the burner shields can improve their chemical resistance to the grease. Although glass-ceramics are typically more inert than metals and will never oxidize, prolonged exposure to certain chemicals at high temperatures can cause the glass-ceramic surface to appear hazy. Increasing the chemical resistance can further extend the aesthetic longevity and reduce any potential ion exchange with salts in the grease that can occur at high temperature. Because the outer surface of the burner shield can be manufactured with minimal outer surface contact, more of the burner shield is exposed to air during the ceramization and forming processes, causing more silicon dioxide to form, thereby improving the glassy surface zone and its resistance to chemical attacks.

The glassy surface zone of the present articles should be at least 50 nm thick to provide sufficient chemical resistance, but not more than about 1,000 nm thick. Glassy zones that are thicker than this can form cracks under extreme thermal load. A glassy surface zone thickness that strikes a very good balance between chemical resistance and thermal stability is between 250 to about 700 nm thick. The thickness of the glassy surface zone is measured from the outer surface of the article, without the enamel coating if present.

The burner shields of the present disclosure can be placed over metal burners, concave side facing the burners, inside of barbecues to protect the burners from the harmful effects of grease drippings. The bottom ends of the burner shields in some embodiments are located about 40 mm to about 60 mm from the top of the burner, about 20 to about 40 mm from the top of the burner, or about 0 to about 20 mm from the top of the burner. The burner shields in some embodiments have a height of about 10 mm to about 100 mm, about 25 mm to about 75 mm, or about 40 to about 60 mm. In some embodiments, the burner shield has a length of about 50 mm to about 250 mm, about 100 to about 200 mm, or about 125 to about 175 mm when measured along an outer surface of the burner shield. The burner shield in some embodiments can have an average thickness of about 0.5 mm to about 10 mm, about 1 to about 8 mm, about 2 to about 5 mm, or about 3 to about 4 mm.

The compositions of the burner shield, which can include transparent glass-ceramic, glass, ceramic, quartz-glass, or a combination thereof, allow the burner to be seen by the user through the burner shield. Conventional metallic burner shields might have small holes that only permit a small portion of the burner to be seen, but the burner shields of the disclosure can be formed entirely or substantially entirely from a transparent material to permit the entire burner to be visible. Since the burner shields can be entirely transparent, the burner shields can be completely solid without any holes, other than holes used to mount the burner shield to the burner assembly or barbeque.

The present disclosure also includes articles, such as burner shields, having a metallic segment and a non-metallic segment. In such embodiments, the non-metallic segment is transparent or translucent. The transparent or translucent segment functions as a window to reveal the items behind the burner shield, for example to allow the burner to be seen by the user. Although the advantages of curved burner segments are described above, the articles in these embodiments are not required to have segments with different curvatures, or segments with any curvature. The articles can be conventional inverted V-shaped burner shields for example, or a variety of other shapes suitable for covering burners or heating elements, except that the articles have a metallic segment and a non-metallic segment.

The transparent or translucent windows of the burner shields should withstand the temperatures to which the burners or heating elements will be heated. The transparent or translucent windows of the burner shields can be made of the materials described above.

The burner shields of the present disclosure are advantageous in that the windows can be directly above or adjacent to the burner flame or heating element. Current burner shield designs have openings or apertures that allow debris, such as grease, to pass through, but in these burner designs, the openings have to be located away from the flame or heating element, since it is undesirable for debris to fall onto the burner. Thus, the user may not have a clear view of the burner. With the burner shields of the present disclosure, the windows can be directly over the burner flame or heating element, thus providing a clear view of the burner or heating element for the user.

Figure 12:
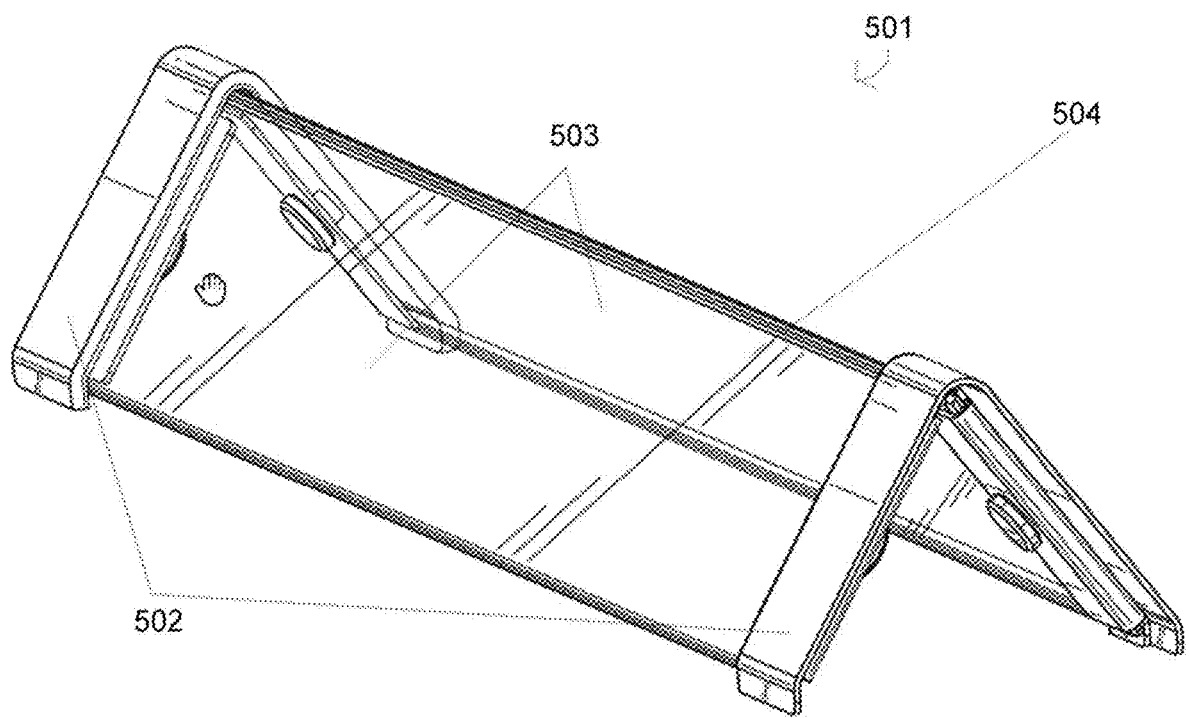
FIG. 12 shows a burner shield where a majority of its side is transparent.
Figure 13:
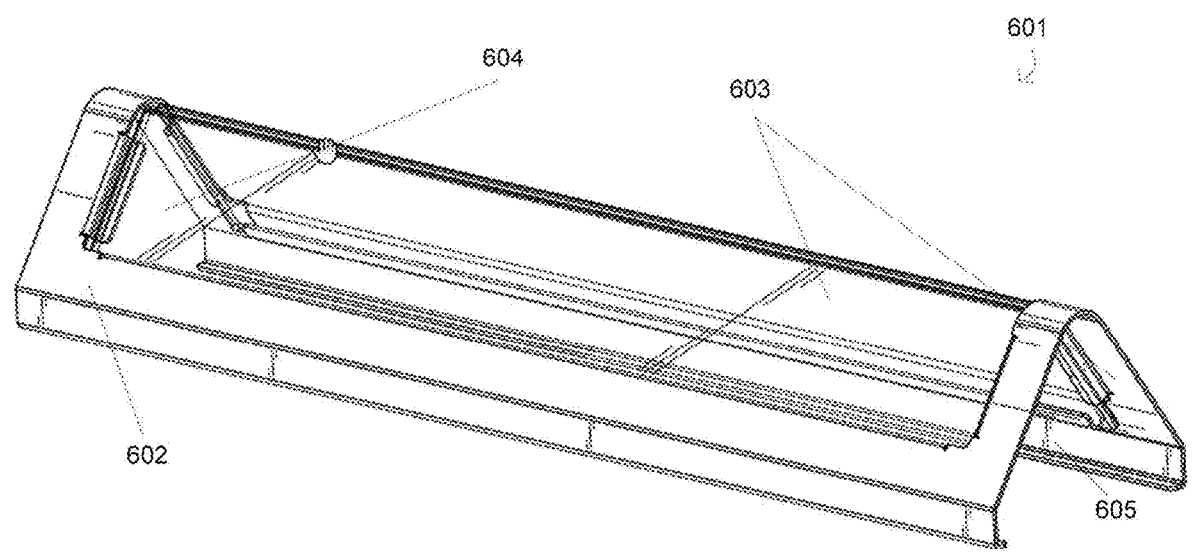
FIG. 13 shows a burner shield where a majority of its side is transparent.

The windows can be centered on the burner shield or located toward one or both ends of the shield. Each shield can have multiple windows. The windows can be located at a crest of a shield as shown in FIGS. 8, 10-11 and 13-14 and/or along the sides as shown in FIGS. 9 and 12-13. The size of the window is not limited. The window can occupy for example at least 20 percent, at least 40 percent, at least 60 percent, or at least 80 percent of the surface of the burner shield.

Figure 8:
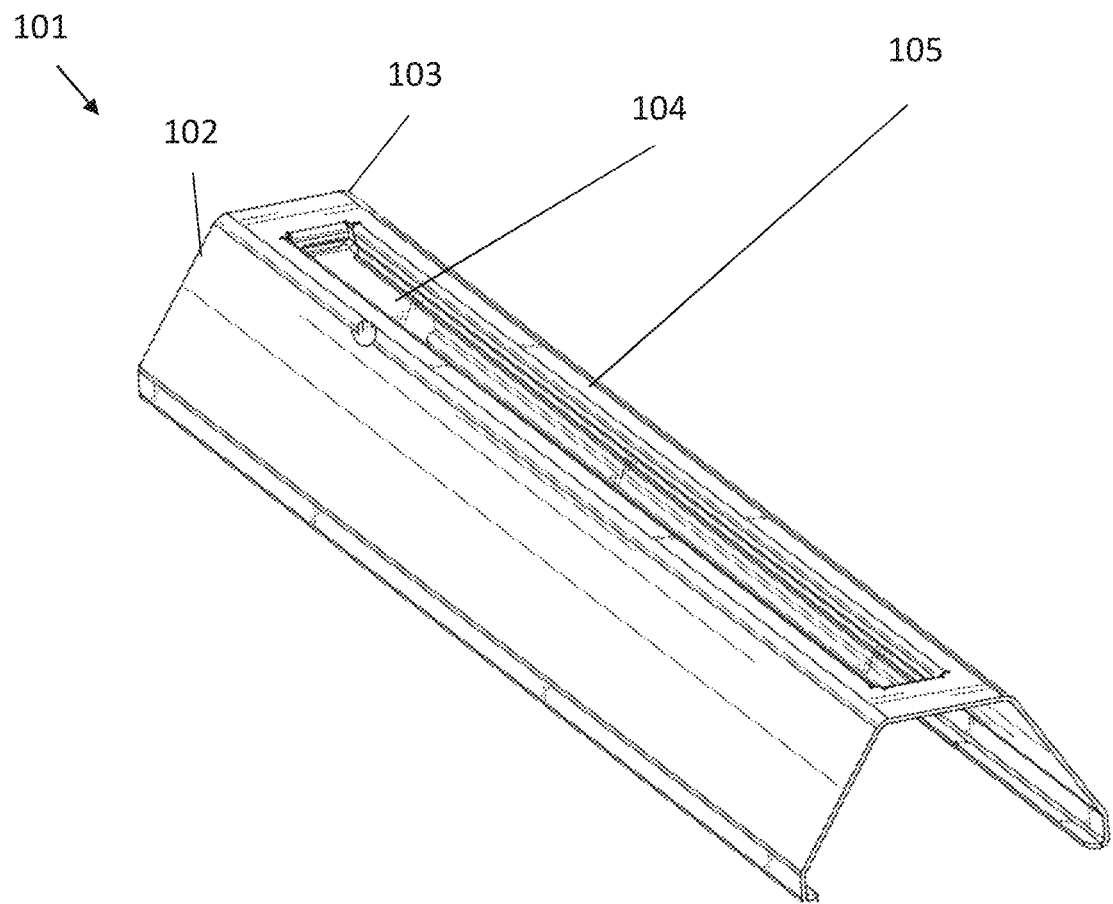
FIG. 8 shows a burner shield where a portion of its peak is transparent.

FIG. 8 shows a burner shield 101 having a metallic body 102 where a portion of its peak 103 is a transparent non-metallic material 104. In this burner shield 102, the transparent material 104 can be aligned with or below the topmost surface 105 of the burner shield 101.

Figures 9A, 9B:
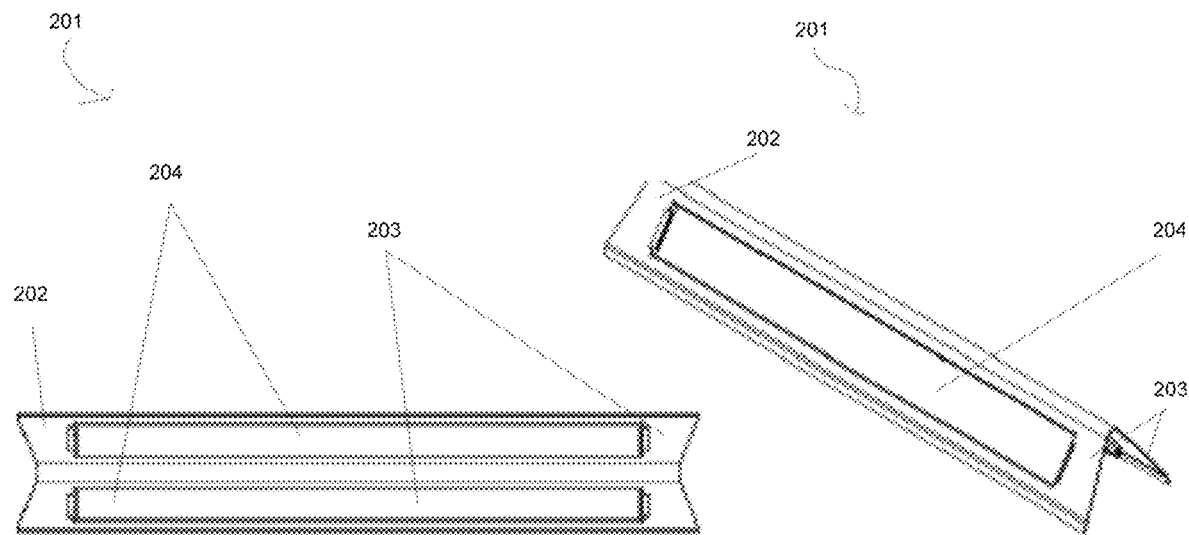
FIGS. 9A and 9B show a burner shield where a portion of its side is transparent.

FIGS. 9A and 9B show a burner shield 201 having a metallic body 202 where a portion of its side or sides 203 is a transparent non-metallic material 204. While both sides 203 have a transparent portion, the present disclosure envisions where only one of the two sides 203 is transparent.

Figure 10:
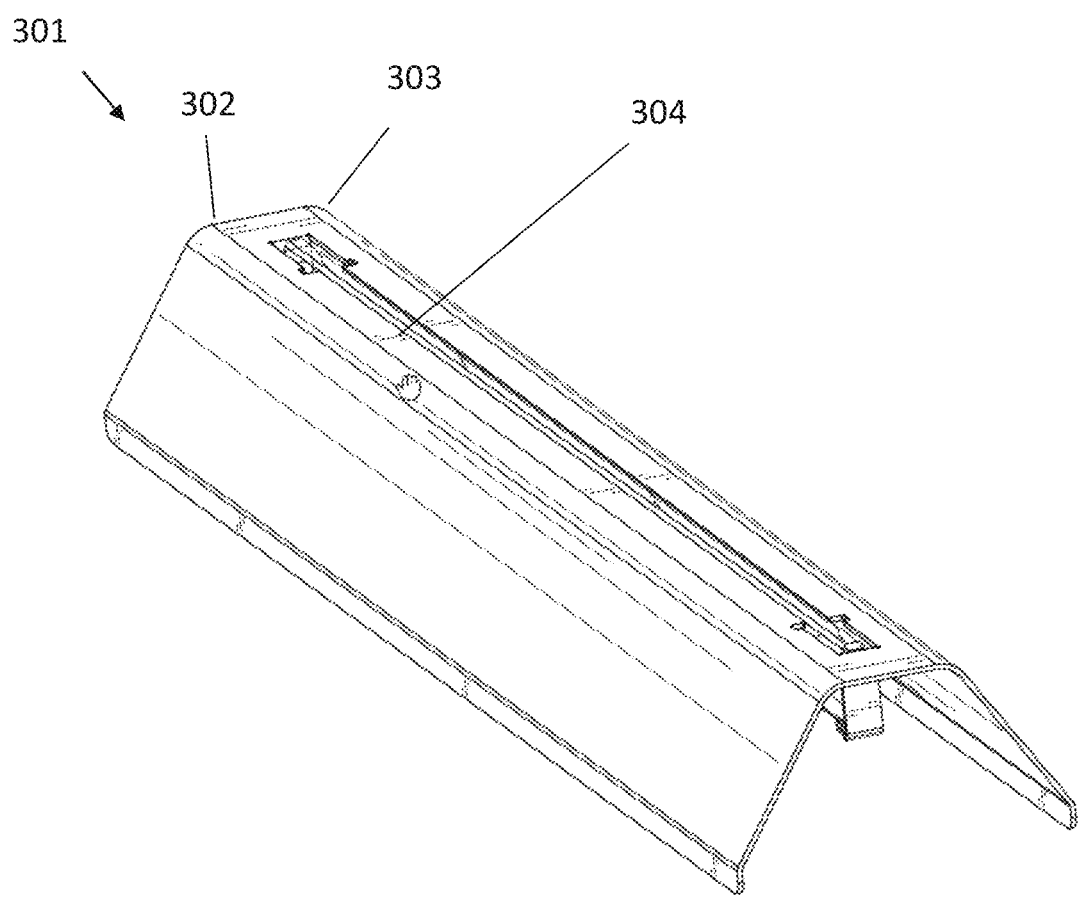
FIG. 10 shows a burner shield where a portion of its peak is open and a transparent material is vertically located below the peak.

FIG. 10 shows a burner shield 301 having a metallic body 302 in which a portion of its peak 303 is open and a transparent non-metallic material 304 is vertically located below the peak 303. Thus, in this design, a transparent portion is recessed in the body 302 of the burner shield 301.

Figure 11:
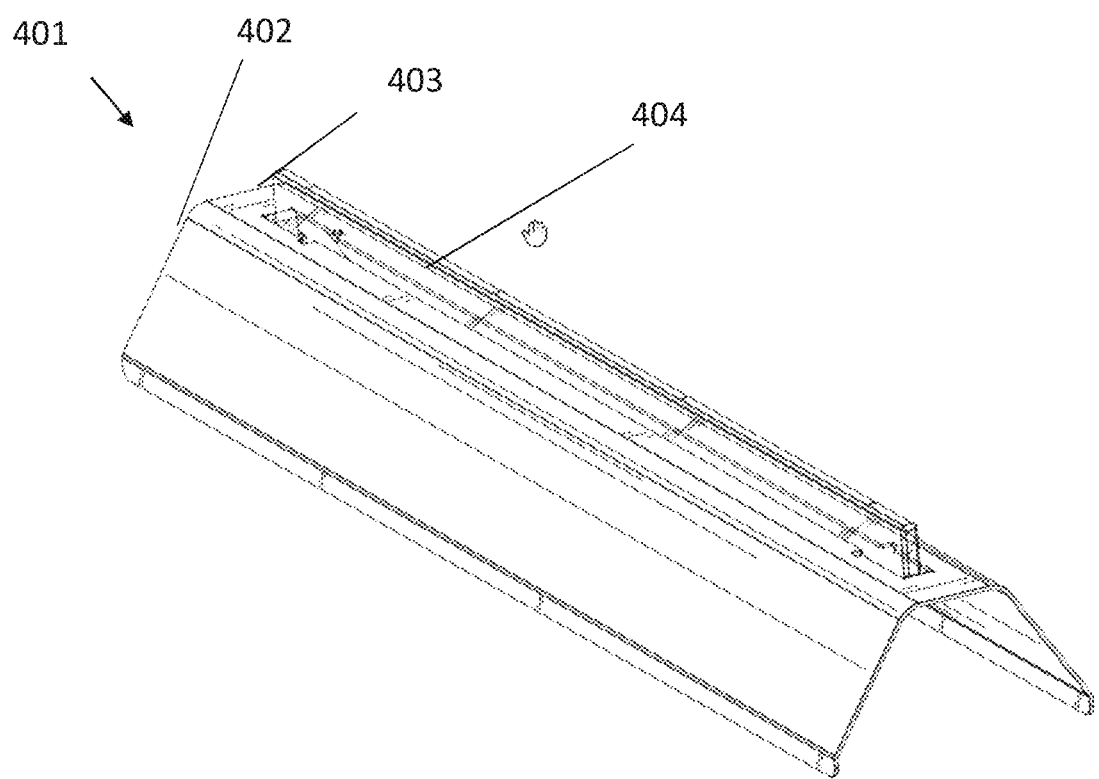
FIG. 11 shows a burner shield where a portion of its peak is open and a transparent material is vertically located above the peak.

FIG. 11 shows a burner shield 401 having a metallic body 402 in which a portion of its peak 403 is open and a transparent non-metallic material 404 is vertically located above the peak 403. The vertical transparent portion here is envisioned to enable a more panoramic view of the flames of the burner.

FIG. 12 shows a burner shield 501 having a metallic body 502 where a majority of its side or sides 503 is a transparent non-metallic material 504. Again, as with the FIG. 9 embodiment, the present disclosure envisions where only one of the two sides 503 is transparent.

FIG. 13 shows another burner shield 601 of the present disclosure having a metallic body 602 where a majority of its side or sides 603 is a transparent non-metallic material 604. Again, as with the FIGS. 9 and 12 embodiments, the present disclosure envisions where only one of the two sides 603 is transparent. This burner shield 601 provides a reinforcing structure 605 about the base of the body and edges of the burner shield.

Figure 14:
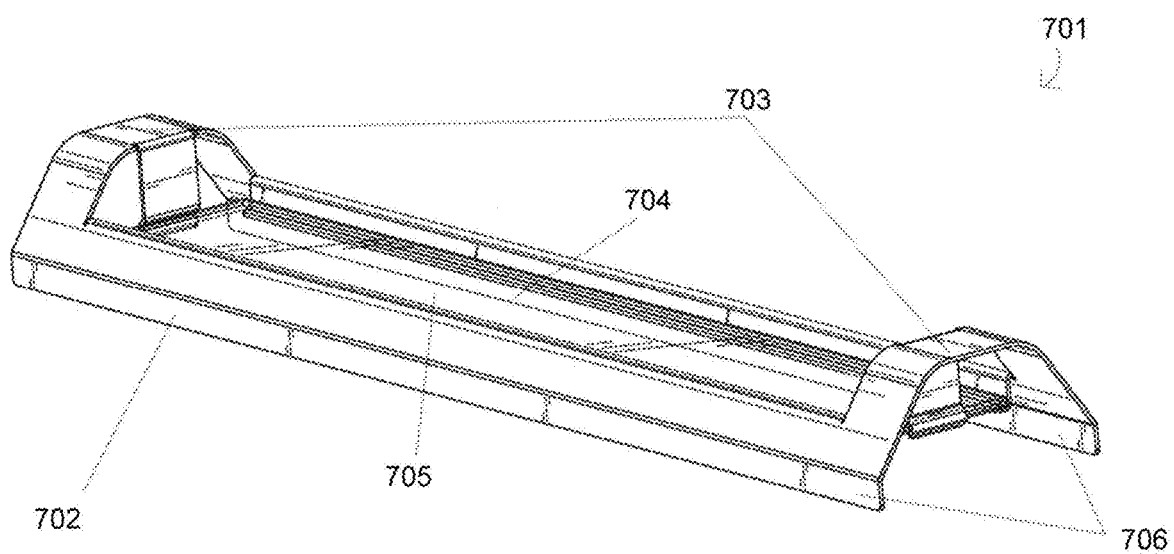
FIG. 14 shows a burner shield with a horizontal transparent portion below its peak.

FIG. 14 shows a burner shield 701 having a metallic body 702 in which a horizontal portion 704 below its peak 703 is a transparent non-metallic material 705. In this burner shield 701, the transparent portion or material 705 can be in a horizontal or substantially horizontal plane and at or below a reinforcing structure 706 or body of the burner shield.

The present disclosure describes in many embodiments to articles used as burner shields, however the disclosure contemplates the articles being useful for other purposes. For non-limiting example, the articles can be used as infrared heater covers, infrared emitters, automotive parts, smoker trays for barbecues, liquid, fragrant or flavor infusers, decorative light bars or reflectors, tubes for transporting water, materials that use infrared energy to evaporate constituents, and heat distributors. The dimensions, curvature and other properties of the articles may need to be adjusted for these uses. For many of these uses, the articles can have a single curvature and be semi-circular (or circular). The articles for these uses can be transparent, translucent, opaque or tinted. All of the articles disclosed herein can be optionally decorated.

The present disclosure includes an article comprising a curved body made of a non-metallic material. The body comprises a first segment with a first curvature, a second segment with a second curvature, and a third segment with a third curvature. The first segment is positioned between the second and third segments, and the second and/or third curvatures are different than the first curvature. In some embodiments, the first, second and third segments have lengths, and the length of the first segment is different than the length of either one of the second or third segments. In some embodiments, the second and third segments have a different curvature.

In certain embodiments, the article comprises a non-metallic body. The non-metallic body has a curved peak having a first curvature, a first curved side having a second curvature and a second curved side having a third curvature. In these certain embodiments, the curved peak is directly connected on one end to the first curved side and on an opposite end to the second curved side. Also, the second curvature is substantially equal to the third curvature, and the first curvature is different than the second and third curvatures.

In certain other embodiments, the article comprises a substantially symmetrical non-metallic curved body. The substantially symmetrical non-metallic body comprises a first segment having a first length, a second segment having a second length, and a third segment having a third length. The first segment is positioned between the second and third segments. Also, the first length is different than each of the second length and the third length.

The first length can be substantially equal to the second length and the third length. The second length can be greater than or less than the first length and greater than or less than the third length. The third length can be greater than or less than the first length and greater than or less than the second length.

The present disclosure also provides a process of producing an article. The process comprises: forming a non-metallic curved body having first, second and third segments. The first segment has a first curvature and is directly connected between the second and third segments. The second segment has a second curvature, and the third segment and has a third curvature. The second curvature is substantially equal to the third curvature, and the first curvature is substantially different than the second and third curvatures.

The article can be a burner shield for use in a cooking apparatus. In some embodiments, the burner shield and a burner form a burner assembly. Still further, in some embodiments, the burner assembly is a component of a barbeque.

The invention claimed is:
1. A burner shield in a cooking apparatus comprising: comprising:
an entirely curved body having a width and a height in a width to height ratio of 0.5 to 4, the entirely curved body comprising a material selected from the group consisting of glass-ceramic, glass, ceramic, quartz-glass, and combinations thereof,
wherein the body comprises a first segment that is non-planar and has a first curvature, a second segment that is non-planar and has a second curvature, and a third segment that is non-planar and has a third curvature,
wherein the first segment is between the second segment and the third segment, and
wherein the second curvature and the third curvature are different than the first curvature.

2. The burner shield of claim 1, wherein the curved body has a length of about 50 mm to about 250 mm.

3. The burner shield of claim 1, wherein the curved body has an average thickness of about 0.5 mm to about 10 mm.

4. The burner shield of claim 1,
wherein the first segment, the second segment, and the third segment each have a length, and
wherein the length of the first segment is different than the length of either the second segment or the third segment.

5. The burner shield of claim 1, wherein the first segment, the second segment, and the third segment are integral to one another.

6. The burner shield of claim 1, wherein the curved body is formed by bending a single piece of non-metallic material.

7. The burner shield of claim 1, wherein the curved body has a convex surface and a concave surface, and wherein the convex surface has an arithmetic mean surface roughness (Ra) of about 0.010 to about 0.250 µm.

8. The burner shield of claim 1, wherein the second and third segments have the same curvature.

9. The burner shield of claim 1, wherein the second segment and the third segment have a different curvature.

10. The burner shield of claim 1, wherein the curved body comprises an outer surface, and the article further comprises a vitreous enamel coating on the outer surface.

11. The burner shield of claim 10, wherein the vitreous enamel coating is from 1 to 100 micrometers thick.

12. The burner shield of claim 10, wherein the vitreous enamel coating has a surface roughness of between 0.1 to 30 micrometers.

13. The burner shield of claim 10, wherein the vitreous enamel coating covers at least 50% of the outer surface.

14. The burner shield of claim 10, wherein the vitreous enamel coating comprises a borosilicate glass comprising 70-85 wt % of $SiO_2$, 10-20 wt % of $B_2O_3$, 2-6 wt % of $Na_2O+K_2O$, and 1-5 wt % of $Al_2O_3$.

15. The burner shield of claim 1, wherein the first segment has a first opening angle from 10 to less than 180 degrees, the second segment has a second opening angle from 5 to 50 degrees, and the third segment has a third opening angle from 5 to 50 degrees.

16. The burner shield of claim 15, wherein the first segment has the first opening angle from 40 to 160 degrees, the second segment has the second opening angle from 10 to 40 degrees, and the third segment has the third opening angle from 10 to 40 degrees.

17. The burner shield of claim 1, wherein the body consists of the first segment, the second segment, and the third segment.

18. A burner shield in a cooking apparatus comprising: comprising:
an entirely curved body having a width and a height in a width to height ratio of 0.5 to 4, the entirely curved body comprising a material selected from the group consisting of glass-ceramic, glass, ceramic, quartz-glass, and any combinations thereof, wherein the body comprises:
a peak that is non-planar and has a first curvature;

a first side that is non-planar and has a second curvature; and a second side that is non-planar and has a third curvature;

wherein the peak is directly connected on one end to the first side and on an opposite end to the second side, wherein the second curvature is substantially equal to the third curvature, and wherein the first curvature is different than the second and third curvatures.

19. The burner shield of claim 18, wherein the curved body has a convex surface and a concave surface, wherein the convex surface has an arithmetic mean surface roughness (Ra) of about 0.010 to about 0.250 μm.

20. The burner shield of claim 19, wherein the convex surface has a ten point mean surface roughness (Rz) of less than about 20 μm.

21. The burner shield of claim 19, wherein the convex surface has a maximum surface roughness (Rmax) of less than about 10 μm.

22. The burner shield of claim 18, wherein the peak has a radius of from 20 to 200 mm, the first side has a radius from 40 to 400 mm, and the second side has a radius from 40 to 400 mm.

23. The burner shield of claim 22, wherein the peak has a radius of from 25 to 100 mm, the first side has a radius from 50 to 200 mm, and the second side has a radius from 50 to 200 mm.

24. The burner shield of claim 18, wherein the peak has a first opening angle from 10 to less than 180 degrees, the first side has a second opening angle from 5 to 50 degrees, and the second side has a third opening angle from 5 to 50 degrees.

25. The burner shield of claim 24, wherein the peak has the first opening angle from 40 to 160 degrees, the first side has the second opening angle from 10 to 40 degrees, and second side has the third opening angle from 10 to 40 degrees.

26. A burner shield in a cooking apparatus comprising: comprising:

a substantially symmetrical and entirely curved body comprising a material selected from the group consisting of glass-ceramic, glass, ceramic, quartz-glass, and any combinations thereof, wherein the curved body comprises a first segment that is non-planar and has a first length having a first opening angle from 10 to less than 180 degrees, a second segment that is non-planar and has a second length having a second opening angle from 5 to 50 degrees, and a third segment that is non-planar and has a third length having a third opening angle from 5 to 50 degrees, wherein the first segment is between the second and third segments, wherein the first length is different than each of the second length and the third length, and wherein the curved body has a convex surface and a concave surface, and wherein the convex surface has an arithmetic mean surface roughness (Ra) of about 0.010 to about 0.250 μm.

27. The burner shield of claim 26, wherein the second length is substantially equal to the third length.

28. The burner shield of claim 26, wherein the first length is less than the second length and is less than the third length.

29. The burner shield of claim 26, wherein the curved body has a width and a height in a width to height ratio of 0.5 to 4.

* * * * *